(12) United States Patent
Park

(10) Patent No.: US 11,941,893 B2
(45) Date of Patent: Mar. 26, 2024

(54) VIRTUAL TRAFFIC LINE GENERATION APPARATUS AND METHOD THEREOF

(71) Applicants: Hyundai Motor Company, Seoul (KR); Kia Corporation, Seoul (KR)

(72) Inventor: Gi Won Park, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 42 days.

(21) Appl. No.: 17/841,908

(22) Filed: Jun. 16, 2022

(65) Prior Publication Data

US 2023/0154205 A1 May 18, 2023

(30) Foreign Application Priority Data

Nov. 16, 2021 (KR) .......................... 10-2021-0157881

(51) Int. Cl.
*G06V 20/56* (2022.01)
*B60K 35/00* (2006.01)
*G06T 11/00* (2006.01)
*G06V 10/72* (2022.01)
*G06V 10/776* (2022.01)

(52) U.S. Cl.
CPC ............ *G06V 20/588* (2022.01); *G06T 11/00* (2013.01); *G06V 10/72* (2022.01); *G06V 10/776* (2022.01); *B60K 35/00* (2013.01); *B60K 35/28* (2024.01); *B60K 2360/168* (2024.01); *B60K 2360/175* (2024.01)

(58) Field of Classification Search
CPC .... G06V 20/588; G06V 10/72; G06V 10/776; G06T 11/00
USPC ................. 345/522; 382/106, 154; 348/142; 701/41
See application file for complete search history.

(56) References Cited

U.S. PATENT DOCUMENTS

| | | | | |
|---|---|---|---|---|
| 11,688,180 | B2 * | 6/2023 | Galan ................. | G06V 20/647 382/103 |
| 2006/0233425 | A1 * | 10/2006 | Kobayashi .......... | G06V 20/588 382/106 |
| 2009/0216405 | A1 * | 8/2009 | Kudo ................... | B62D 15/025 701/41 |
| 2010/0238283 | A1 * | 9/2010 | Kim ...................... | B60W 50/16 348/135 |

(Continued)

FOREIGN PATENT DOCUMENTS

| | | |
|---|---|---|
| KR | 10-1295077 B | 8/2013 |
| KR | 10-1455835 B | 11/2014 |

OTHER PUBLICATIONS

Zhang Peng Method and device for fitting lane line Nov. 23, 2011 Beijing Jingdong Qianshi Tech Co Ltd CN202110971268 20210820 paragraphs 1-139 English.*

(Continued)

*Primary Examiner* — Prabodh M Dharia
(74) *Attorney, Agent, or Firm* — MORGAN, LEWIS & BOCKIUS LLP

(57) ABSTRACT

A virtual traffic line generation apparatus and a method thereof are provided. The virtual traffic line generation apparatus includes a controller that determines reliability of a traffic line detected for each frame and generates a virtual traffic line based on a traffic line with the highest reliability among traffic lines detected in a previous frame when the traffic line is not detected and a storage storing the reliability of the traffic line for each frame.

12 Claims, 16 Drawing Sheets

(56) References Cited

U.S. PATENT DOCUMENTS

2011/0216938 A1     9/2011  Suzuki
2019/0258249 A1*    8/2019  Kim .................. G01C 21/3837
2020/0363801 A1*   11/2020  He ...................... G05D 1/0088

OTHER PUBLICATIONS

Zhang Peng Method and device for fitting lane line Nov. 23, 2021 Beijing Jingdong Qianshi Tech Co Ltd CN202110971268 20210820 paragraphs 1-139 Chinese.*

* cited by examiner

VIRTUAL TRAFFIC LINE GENERATION APPARATUS AND METHOD THEREOF

CROSS-REFERENCE TO RELATED APPLICATION

The present application claims priority to Korean Patent Application No. 10-2021-0157881, filed on Nov. 16, 2021, the entire contents of which is incorporated herein for all purposes by this reference.

BACKGROUND OF THE PRESENT DISCLOSURE

Field of the Present Disclosure

The present disclosure relates to technologies of generating a virtual traffic line based on reliability of a traffic line.

Description of Related Art

Due to the wear of the traffic line, the use of defective paint, and the like, it is often the case that the reflectivity of the traffic line does not meet the road regulations. Thus, when driving at night, traffic accidents occur frequently because drivers do not properly recognize traffic lines.

Furthermore, when it rains, the reflectivity of the traffic line drops sharply as a water film is formed on the road due to rainwater. Thus, traffic accidents according to no detection of traffic lines occur more frequently when it rains than when it does not rain.

When an autonomous vehicle which detects a traffic line based on an image does not detect the traffic line due to the above-mentioned reasons, because it performs autonomous driving without information related to the traffic line, it is unable to ensure safety of passengers.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a virtual traffic line generation apparatus of determining reliability of a traffic line detected for each frame, storing the reliability of the traffic line for each frame, and generating a virtual traffic line based on a traffic line with the highest reliability among traffic lines detected in a previous frame when the traffic line is not detected to ensure driving safety of an autonomous vehicle even when the traffic line is not detected and a method thereof.

Another aspect of the present disclosure provides a virtual traffic line generation apparatus of determining reliability of a traffic line detected for each frame, storing the reliability of the traffic line for each frame, generating a virtual traffic line based on a traffic line with the highest reliability among traffic lines detected in a previous frame when the traffic line is not detected, and providing the virtual traffic line and reliability corresponding to the virtual traffic line together so that an autonomous vehicle may use the reliability as a parameter when performing various autonomous driving policies, and a method thereof.

The purposes of the present disclosure are not limited to the aforementioned purposes, and any other purposes and advantages not mentioned herein will be clearly understood from the following description and may more clearly known by an exemplary embodiment of the present disclosure. Furthermore, it may be easily seen that purposes and advantages of the present disclosure may be implemented by means indicated in claims and a combination thereof.

According to an aspect of the present disclosure, a virtual traffic line generation apparatus may include a controller configured for determining reliability of a traffic line detected for each frame and generates a virtual traffic line based on a traffic line with the highest reliability among traffic lines detected in a previous frame when the traffic line is not detected and a storage storing the reliability of the traffic line for each frame.

In an exemplary embodiment of the present disclosure, the controller may represent the detected traffic line in a form of a quadratic function and may determine a degree to which the quadratic function is identical to a real traffic line as the reliability of the detected traffic line.

In an exemplary embodiment of the present disclosure, the controller may obtain an x2 value on the quadratic function for a y value with respect to any coordinate value (x1, y) on the real traffic line, may determine an error between an x1 value on the real traffic line and the x2 value on the quadratic function, counts a case where the error is less than or equal to a reference value as a valid number of times, and may determine a ratio of the valid number of times to a total number of times as the reliability of the detected traffic line.

In an exemplary embodiment of the present disclosure, it may be preferable that the total number of times is greater than the reference number of times.

In an exemplary embodiment of the present disclosure, the controller may provide the virtual traffic line and reliability corresponding to the virtual traffic line together to an autonomous vehicle.

According to another aspect of the present disclosure, a virtual traffic line generation method may include determining, by a controller, reliability of a traffic line detected for each frame, storing, by a storage, the reliability of the traffic line for each frame, and generating, by the controller, a virtual traffic line based on a traffic line with a highest reliability among traffic lines detected in a previous frame, when the traffic line is not detected.

In an exemplary embodiment of the present disclosure, the determining of the reliability may include representing the detected traffic line in a form of a quadratic function and determining a degree to which the quadratic function is identical to a real traffic line as the reliability of the detected traffic line.

In an exemplary embodiment of the present disclosure, the determining of the degree to which the quadratic function is identical to the real traffic line as the reliability of the detected traffic line may include obtaining an x2 value on the quadratic function for a y value with respect to any coordinate value (x1, y) on the real traffic line, determining an error between an x1 value on the real traffic line and the x2 value on the quadratic function, counting a case where the error is less than or equal to a reference value as a valid number of times, and determining a ratio of the valid number of times to a total number of times as the reliability of the detected traffic line.

In an exemplary embodiment of the present disclosure, the virtual traffic line generation method may further include providing the virtual traffic line and reliability corresponding to the virtual traffic line together to an autonomous vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
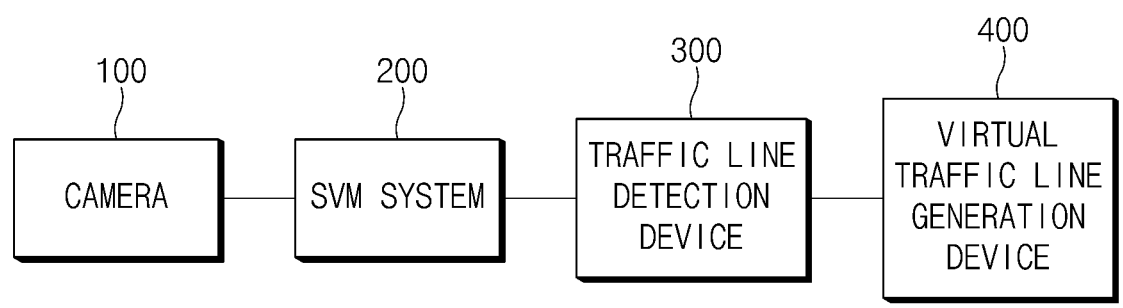
FIG. 1 is a block diagram illustrating an example of a system for detecting a traffic line based on an image, to which an exemplary embodiment of the present disclosure is applied.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding the reference numerals to the components of each drawing, it should be noted that the identical component is designated by the identical numerals even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2A:
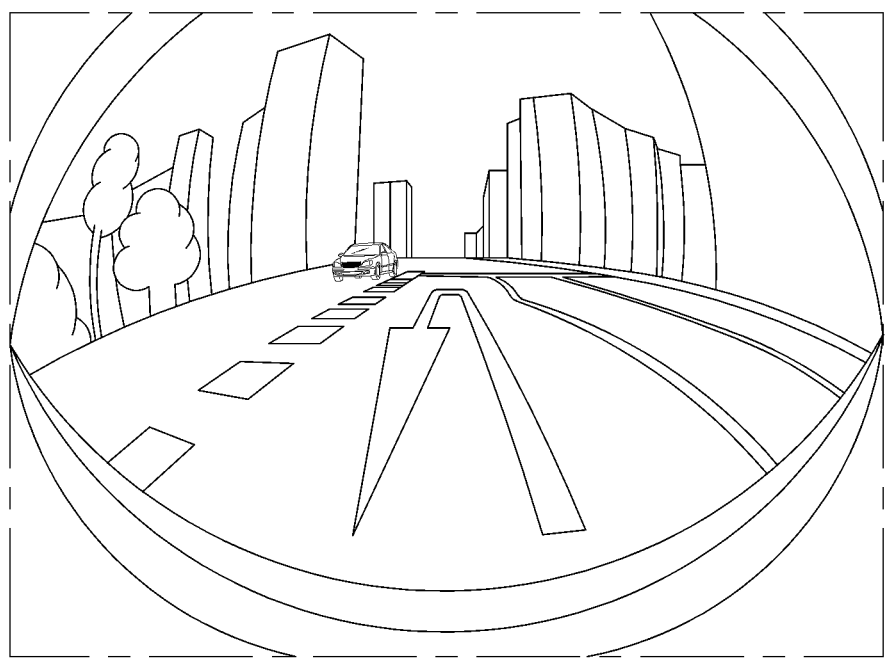
FIG. 2A is a drawing illustrating an example of an image captured by a front view camera provided in a system for detecting a traffic line based on an image, to which an exemplary embodiment of the present disclosure is applied.
Figure 2B:
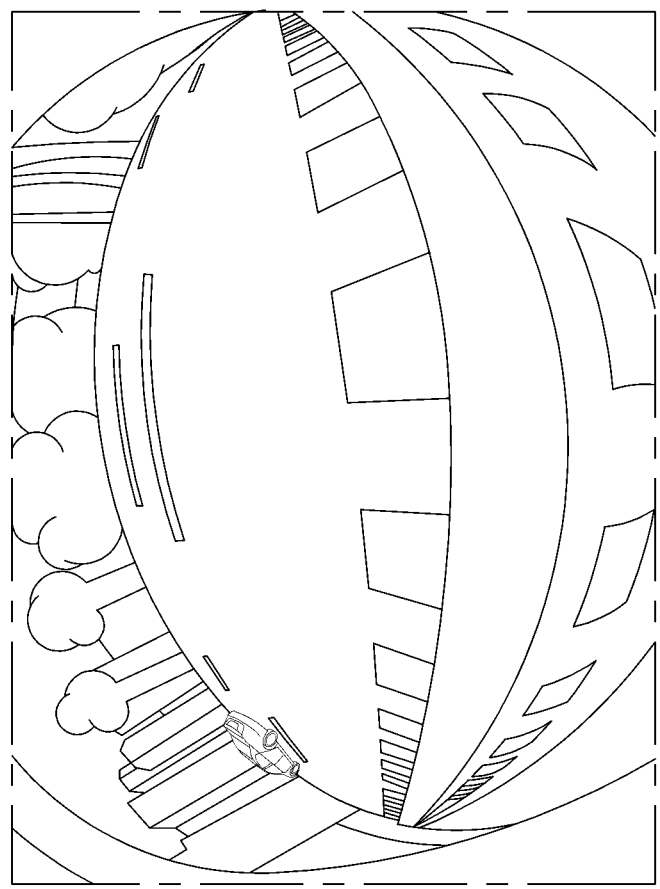
FIG. 2B is a drawing illustrating an example of an image captured by a left view camera provided in a system for detecting a traffic line based on an image, to which an exemplary embodiment of the present disclosure is applied.
Figure 2C:
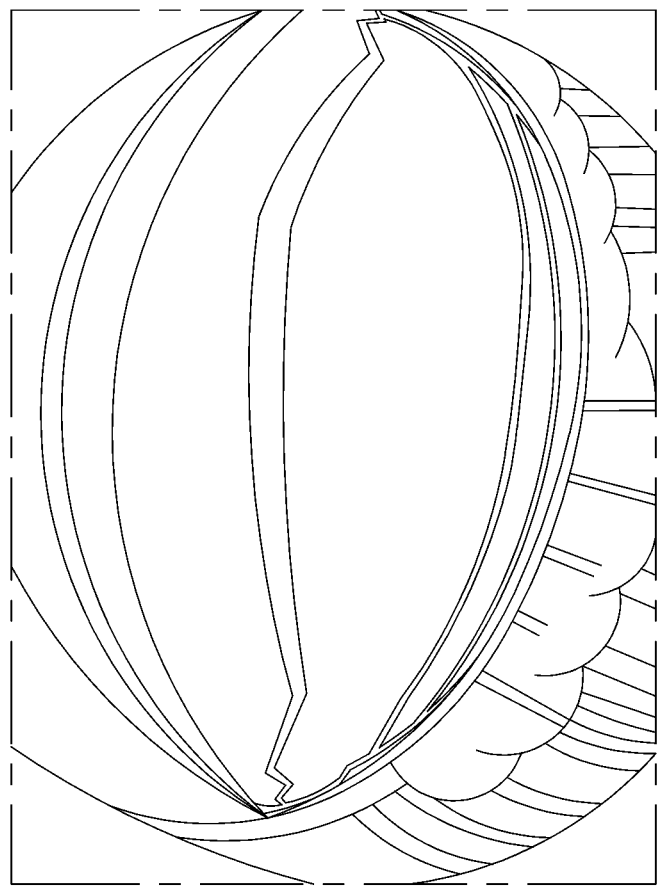
FIG. 2C is a drawing illustrating an example of an image captured by a right view camera provided in a system for detecting a traffic line based on an image, to which an exemplary embodiment of the present disclosure is applied.
Figure 5A:
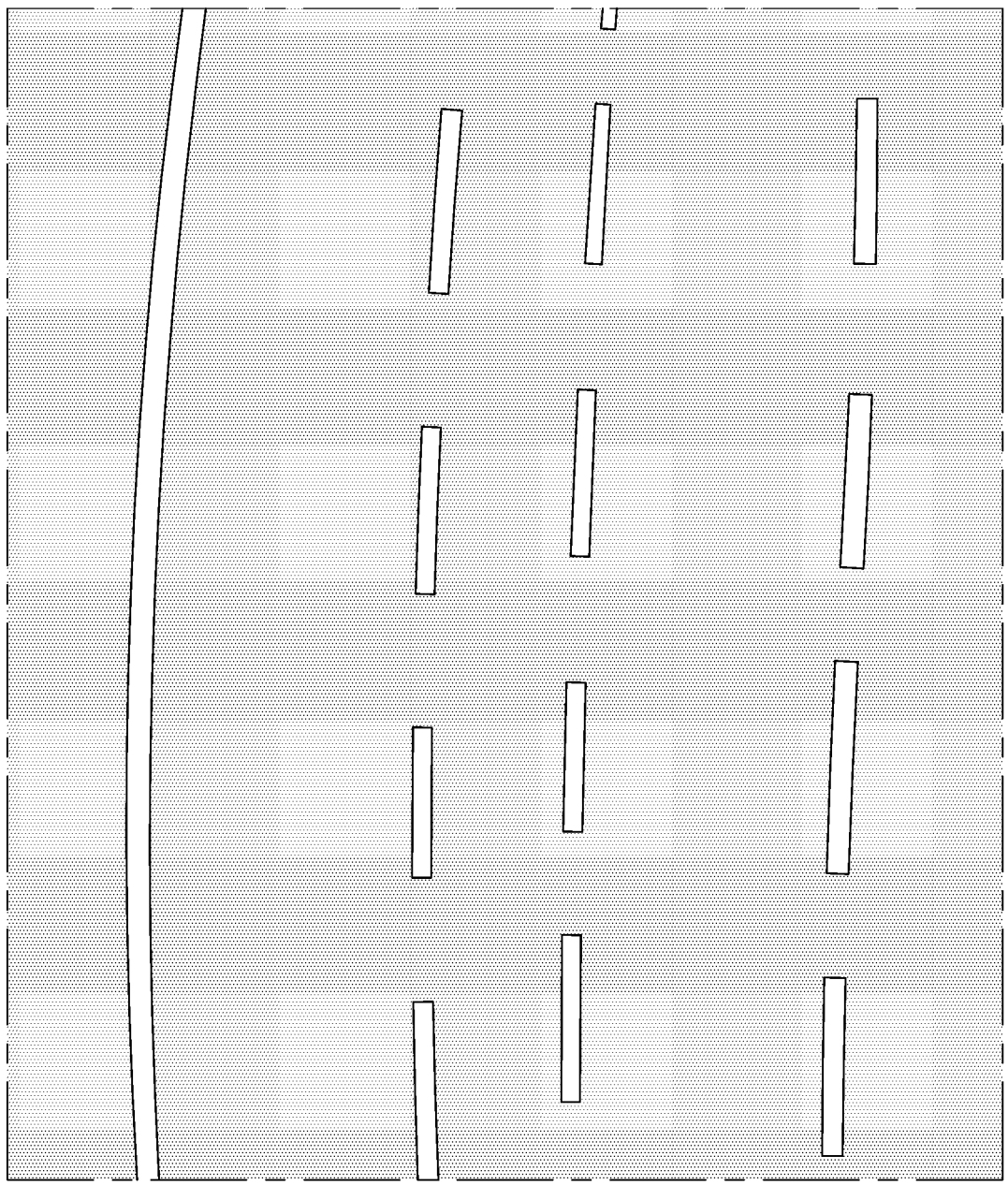
FIG. 5A is a drawing illustrating an example of a result where a traffic line detection device provided in a system for detecting a traffic line based on an image, to which an exemplary embodiment of the present disclosure is applied, binarizes a top view image.
Figure 5B:
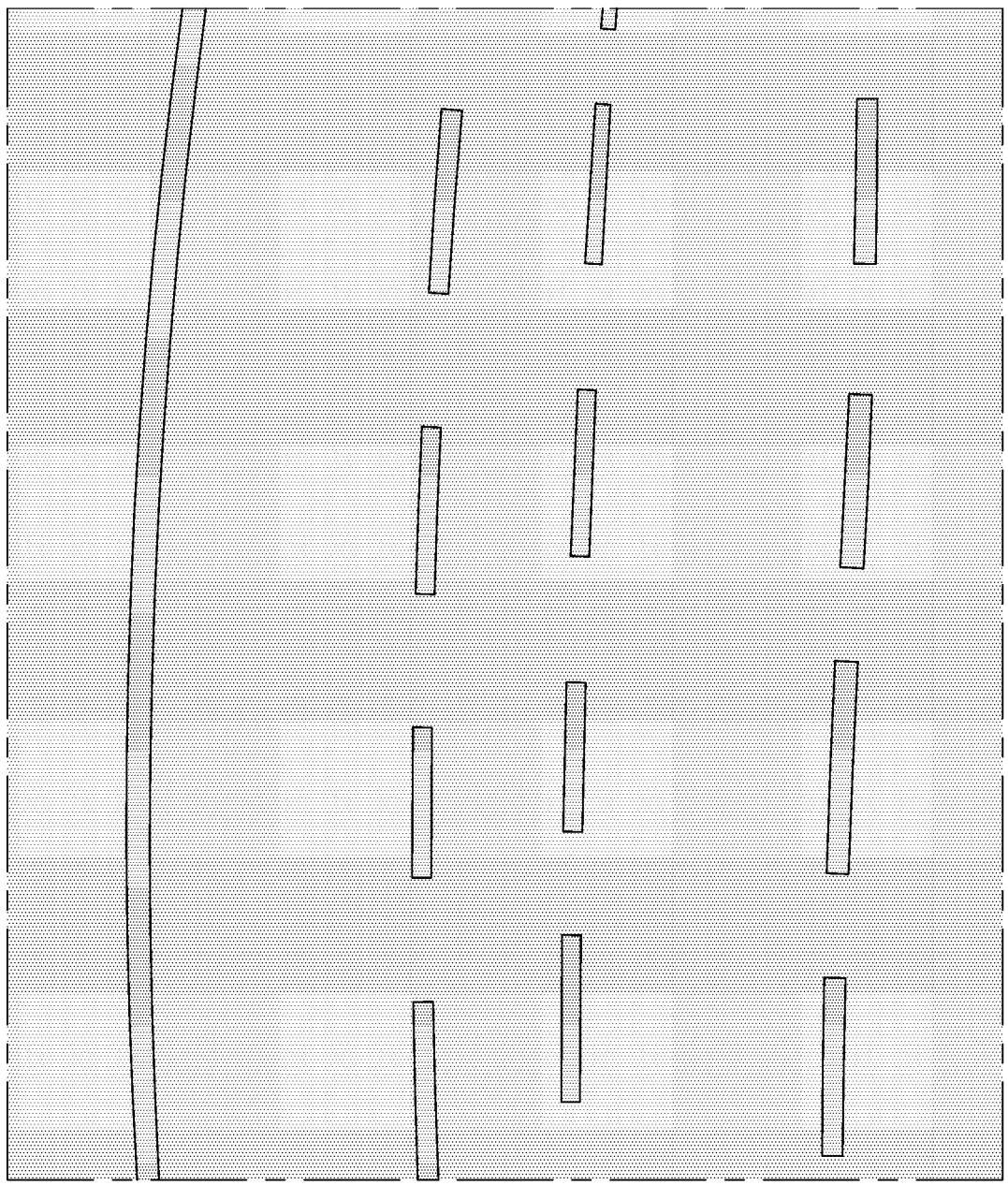
FIG. 5B is a drawing illustrating an example of a result where a traffic line detection device provided in a system for detecting a traffic line based on an image, to which an exemplary embodiment of the present disclosure is applied, extracts an edge of a traffic line from a binary image.
Figure 5C:
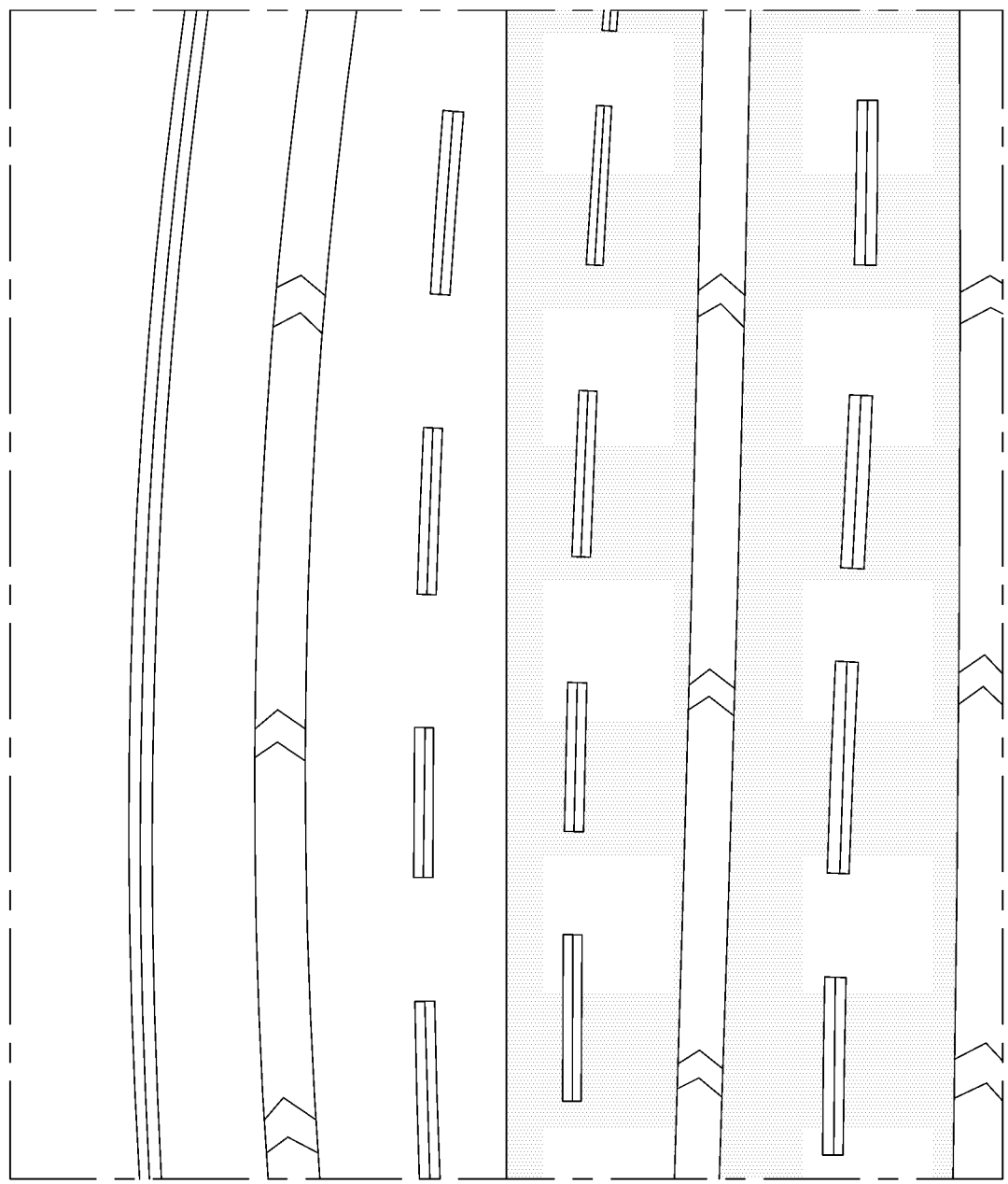
FIG. 5C is a drawing illustrating an example of a result where a traffic line detection device provided in a system for detecting a traffic line based on an image, to which an exemplary embodiment of the present disclosure is applied, extracts a central point from a traffic line area.
Figure 5D:
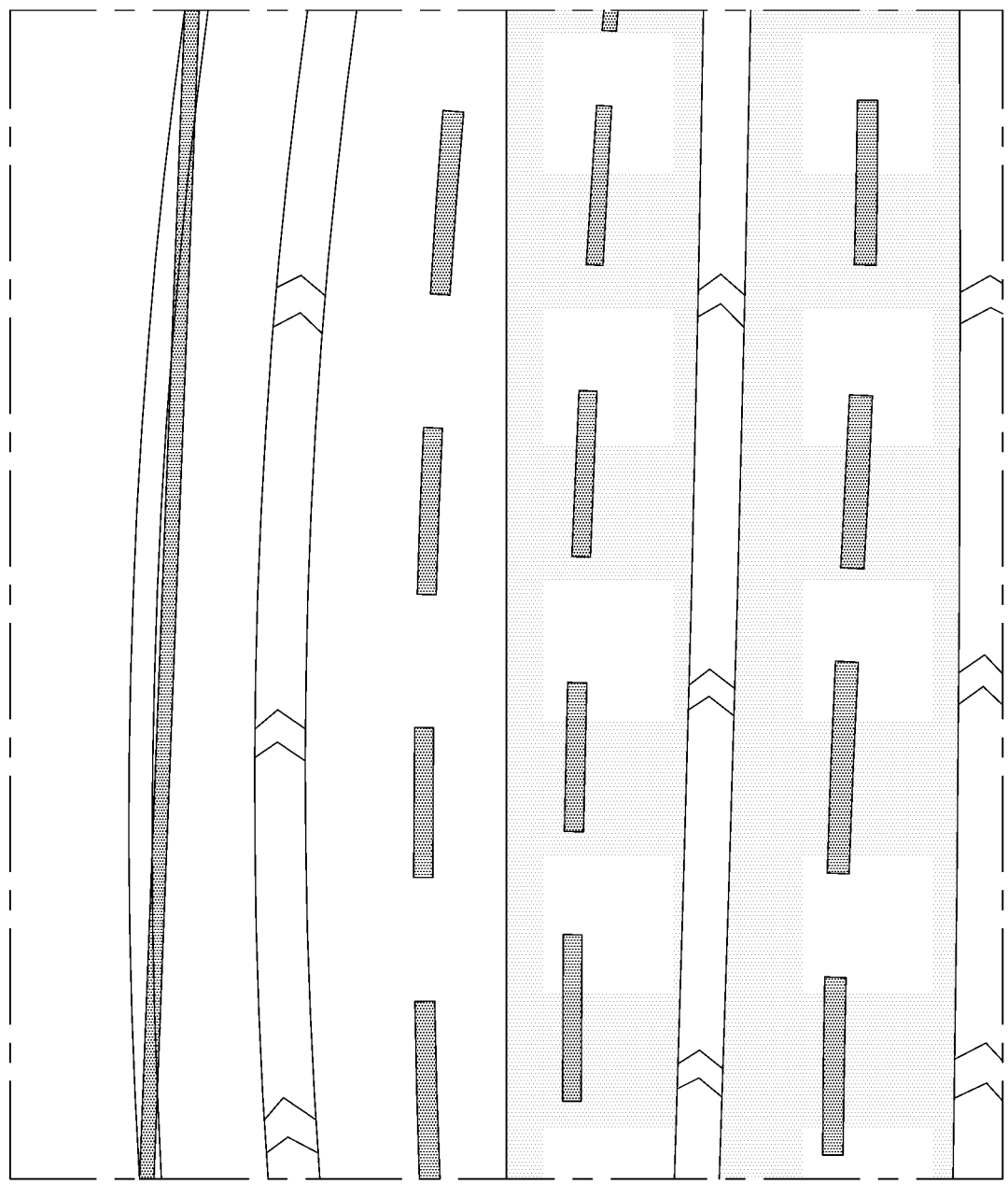
FIG. 5D is a drawing illustrating an example of a result where a traffic line detection device provided in a system for detecting a traffic line based on an image, to which an exemplary embodiment of the present disclosure is applied, clusters central points of a traffic line area.
Figure 5E:
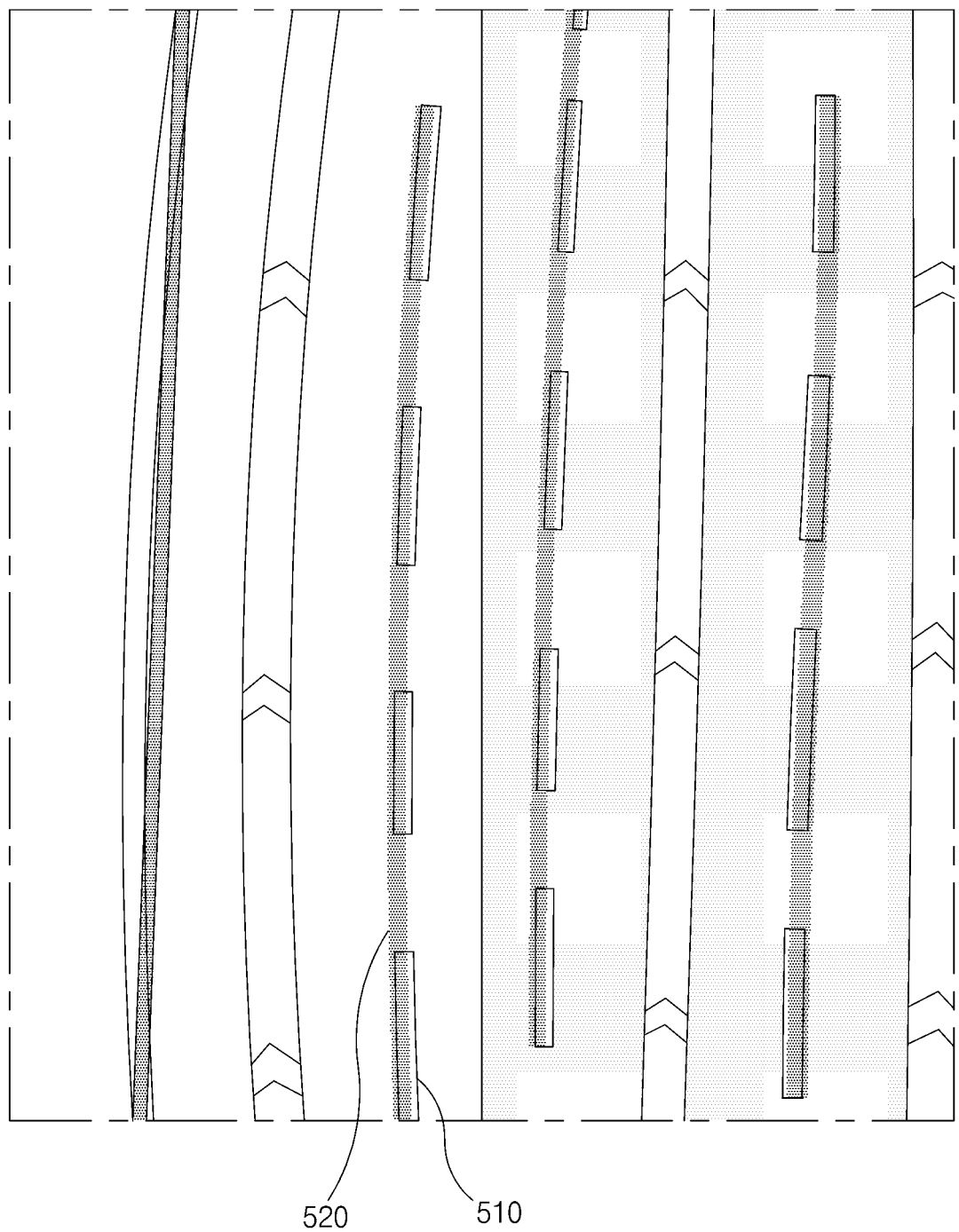
FIG. 5E is a drawing illustrating an example of a result where a traffic line detection device provided in a system for detecting a traffic line based on an image, to which an exemplary embodiment of the present disclosure is applied, detects a traffic line.

FIG. 1 is a block diagram illustrating an example of a system for detecting a traffic line based on an image, to which an exemplary embodiment of the present disclosure is applied. FIG. 2A is a drawing illustrating an example of an image captured by a front view camera provided in a system for detecting a traffic line based on an image, to which an exemplary embodiment of the present disclosure is applied. FIG. 2B is a drawing illustrating an example of an image captured by a left view camera provided in a system for detecting a traffic line based on an image, to which an exemplary embodiment of the present disclosure is applied. FIG. 2C is a drawing illustrating an example of an image captured by a right view camera provided in a system for detecting a traffic line based on an image, to which an exemplary embodiment of the present disclosure is applied. FIG. 5A is a drawing illustrating an example of a result where a traffic line detection device provided in a system for detecting a traffic line based on an image, to which an exemplary embodiment of the present disclosure is applied, binarizes a top view image. FIG. 5B is a drawing illustrating an example of a result where a traffic line detection device provided in a system for detecting a traffic line based on an image, to which an exemplary embodiment of the present disclosure is applied, extracts an edge of a traffic line from a binary image. FIG. 5C is a drawing illustrating an example of a result where a traffic line detection device provided in a system for detecting a traffic line based on an image, to which an exemplary embodiment of the present disclosure is applied, extracts a central point from a traffic line area. FIG. 5D is a drawing illustrating an example of a result where a traffic line detection device provided in a system for detecting a traffic line based on an image, to which an exemplary embodiment of the present disclosure is applied, clusters central points of a traffic line area. FIG. 5E is a drawing illustrating an example of a result where a traffic line detection device provided in a system for detecting a traffic line based on an image, to which an exemplary embodiment of the present disclosure is applied, detects a traffic line.

As shown in FIG. 1, the system for detecting the traffic line based on the image, to which an exemplary embodiment of the present disclosure is applied, may include a camera 100, a surround view monitoring (SVM) system 200, a traffic line detection device 300, and a virtual traffic line generation apparatus 400. Herein, the virtual traffic line generation apparatus 400 may be implemented to merge into the traffic line detection device 300 so that the traffic line detection device 300 performs all functions of the virtual traffic line generation apparatus 400.

Seeing the respective components, first of all, the camera 100 may be an image capture device which captures an image around a vehicle, which may include a front view camera, a rear view camera, a left view camera, and a right view camera. Such cameras may be tuned so that an optimal surround view (SV) image (e.g., a top view image) may be generated.

The front view camera may be located in front of the vehicle and may be used to obtain an image in front of the vehicle. The front view camera may be located on a center portion between both headlamps of the vehicle, but not limited thereto. An example of an image captured by such a front view camera is shown in FIG. 2A.

The rear view camera may be located on the rear of the vehicle and may be used to obtain an image behind the vehicle. The rear view camera may be located on a center portion between both rear lamps of the vehicle, but not limited thereto.

The left view camera may be located on the left side of the vehicle and may be used to obtain an image at the left of the vehicle. The left view camera may be located on a lower end portion of the left side mirror of the vehicle, but not limited thereto. An example of an image captured by such a left view camera is shown in FIG. 2B.

The right view camera may be located on the right side of the vehicle and may be used to obtain an image at the right of the vehicle. The right view camera may be located on a lower end portion of the right side mirror of the vehicle, but not limited thereto. An example of an image captured by such a right view camera is shown in FIG. 2C.

Figure 3A:
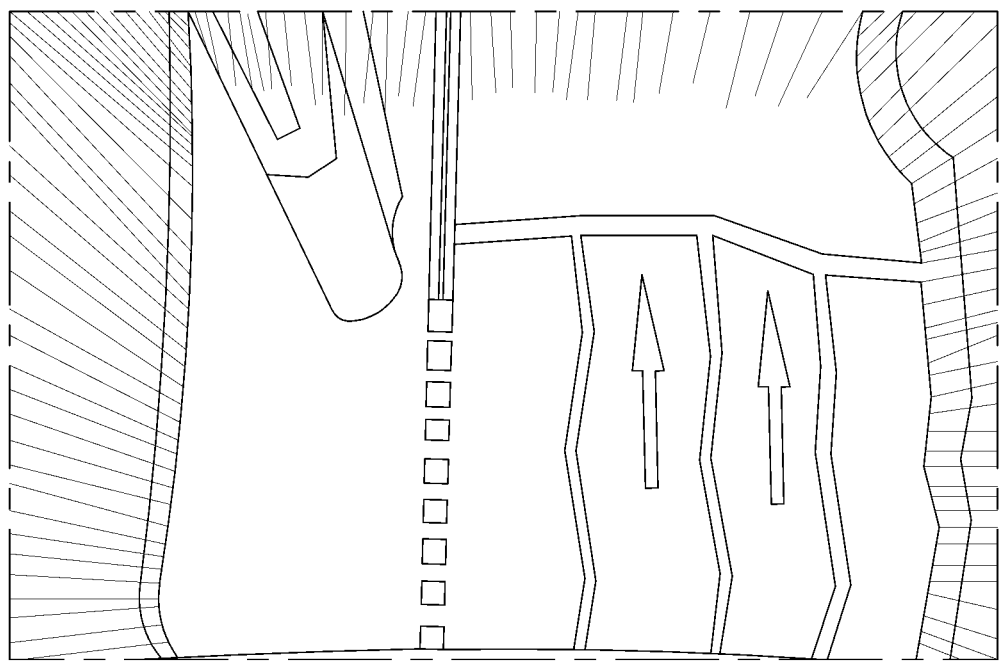
FIG. 3A is a drawing illustrating an example of a top view image generated by an SVM system provided in a system for detecting a traffic line based on an image, to which an exemplary embodiment of the present disclosure is applied.
Figure 3B:
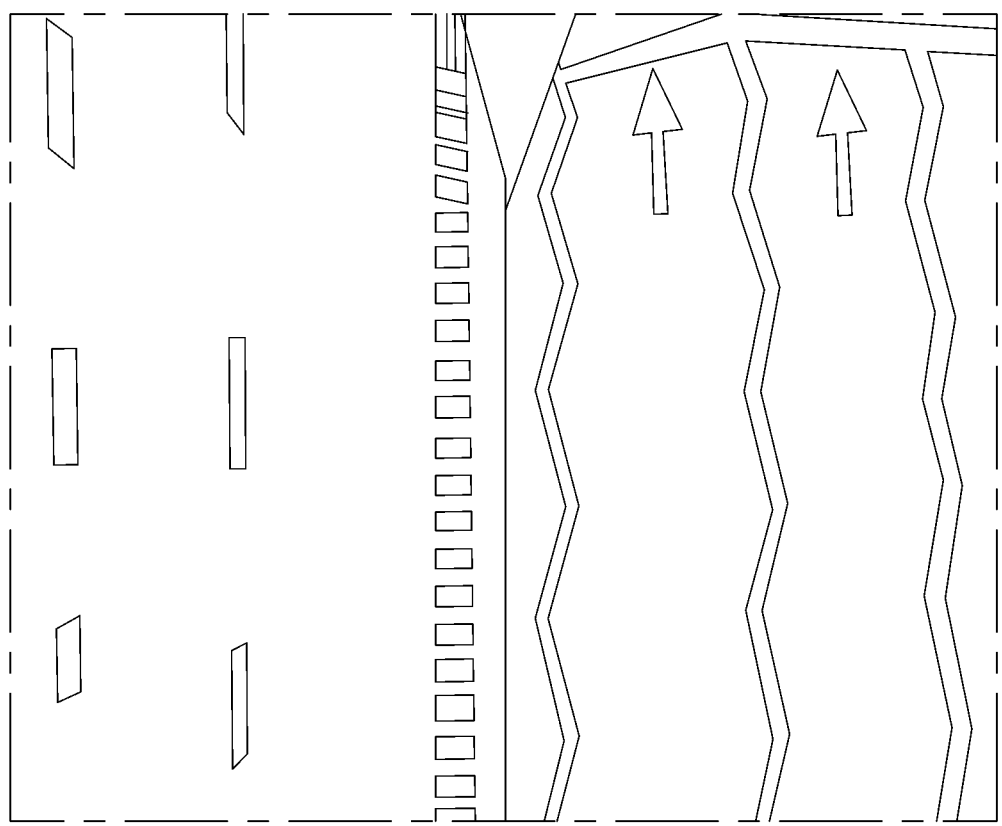
FIG. 3B is a drawing illustrating another example of a top view image generated by an SVM system provided in a system for detecting a traffic line based on an image, to which an exemplary embodiment of the present disclosure is applied.

The SVM system 200 may convert the image captured by the camera 100 into a top view image. The top view image generated by such an SVM system 200 is shown in FIG. 3A and FIG. 3B. FIG. 3A illustrates the result of converting a front view image captured by a front view camera into a top view. FIG. 3B illustrates a top view image generated using a left view image captured by a left view camera and a right view image captured by a right view camera.

A traffic line detection device 300 of FIG. 1 may detect a traffic line for each frame based on a top view image generated by an SVM system 200 of FIG. 1.

Hereinafter, the operation of the traffic line detection device 300 will be described in detail.

Figure 4A:
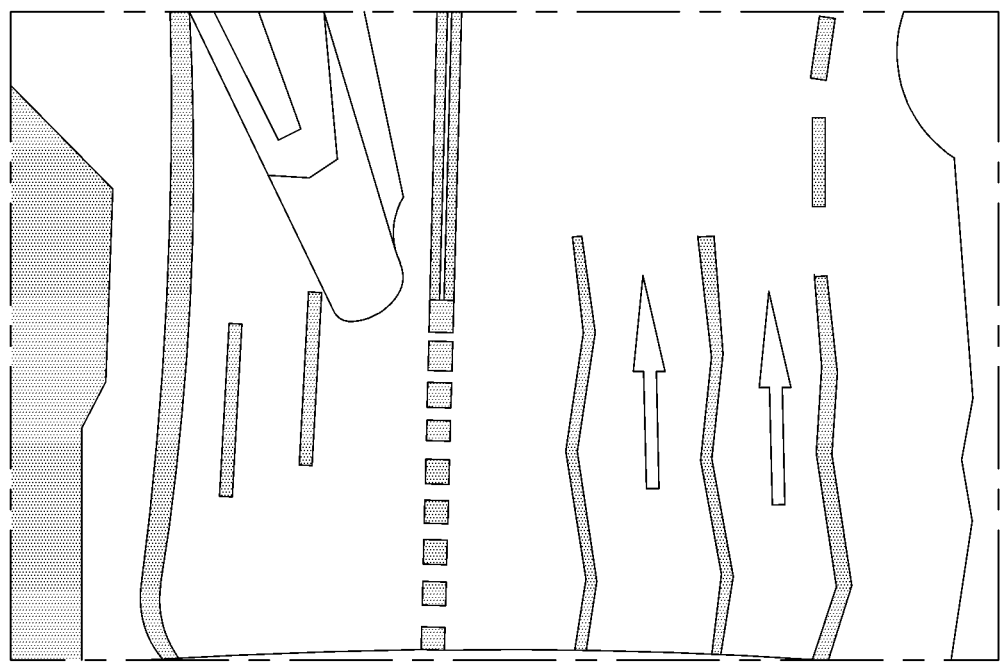
FIG. 4A is a drawing illustrating an example of a result where a traffic line detection device provided in a system for detecting a traffic line based on an image, to which an exemplary embodiment of the present disclosure is applied, classifies an object in a top view image.
Figure 4B:
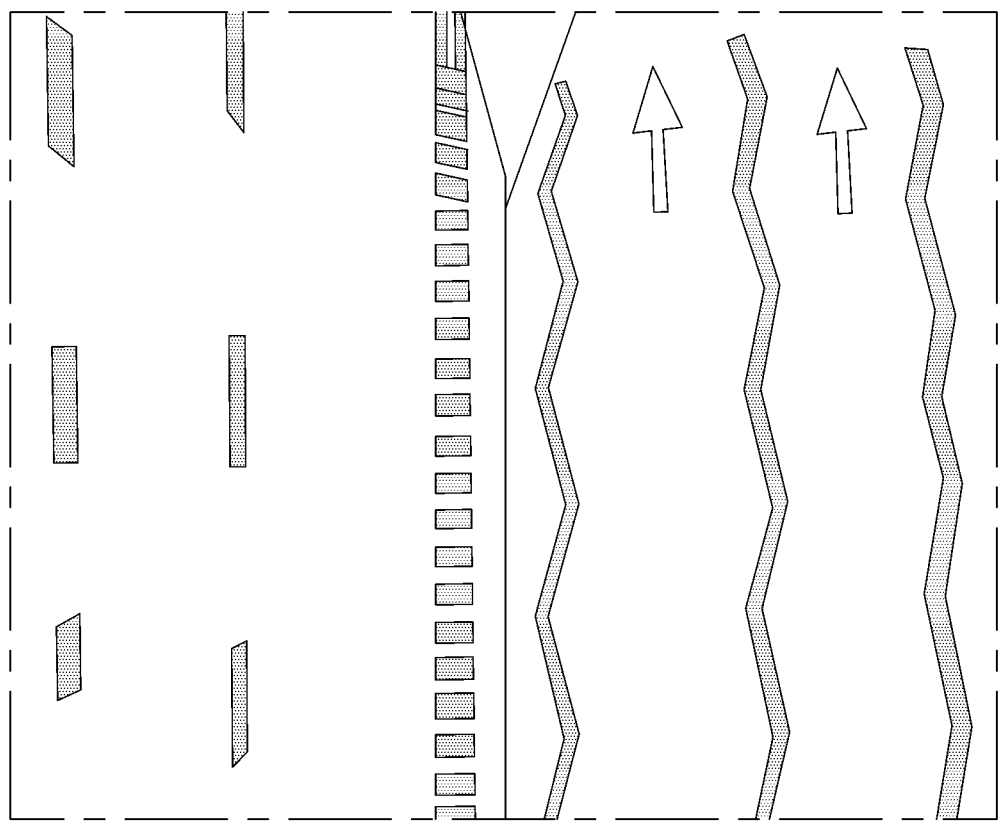
FIG. 4B is a drawing illustrating another example of a result where a traffic line detection device provided in a system for detecting a traffic line based on an image, to which an exemplary embodiment of the present disclosure is applied, classifies an object in a top view image.

First of all, the traffic line detection device 300 may have a traffic line detection model, deep learning of which is completed, and may classify an object in the top view image generated by the SVM system 200 based on the traffic line detection model. In other words, the traffic line detection device 300 may detect class information of each pixel for each frame of the top view image. The detected class information of each pixel is shown in FIG. 4A and FIG. 4B. FIG. 4A illustrates the result of detecting class information of each pixel from a front top view image of a vehicle. FIG. 4B illustrates the result of detecting class information of each pixel from left and right top view images of a vehicle.

A traffic line detection device 300 of FIG. 1 may binarize pixels corresponding to a traffic line into white (255) and may binarize the remaining pixels into black (0) in a top view image. The binarized image (hereinafter referred to as a "binary image") is shown in FIG. 5A.

Thereafter, the traffic line detection device 300 may extract an edge of a traffic line area from the binary image. In the instant case, a portion where the pixel value changes from 0 to 255 is referred to as a rising edge, and a portion where the pixel value changes from 255 to 0 is referred to as a falling edge. The extracted edge of the traffic line area is shown in FIG. 5B.

Thereafter, the traffic line detection device 300 may extract points located in the center portion of the traffic line area (hereinafter referred to as "central points"). In the instant case, the traffic line detection device 300 may regard an area where width is greater than a reference value in the traffic line area as noise to exclude the area from the traffic line area. The extracted central points are shown in FIG. 5C.

Thereafter, the traffic line detection device 300 may cluster adjacent central points. In the instant case, the traffic line detection device 300 may cluster points where the square of the distance between points is less than or equal to 9 (where one pixel is 1). The clustered result (hereinafter referred to as a "cluster") is shown in FIG. 5D.

Thereafter, the traffic line detection device 300 may connect the clusters to detect a traffic line. In the instant case, the traffic line detection device 300 may connect the clusters with regard to a distance and an angle between the clusters. For example, when a distance between a first cluster and a second cluster is less than a reference distance and when an angle between the first cluster and the second cluster is less than a reference angle, the traffic line detection device 300 may connect the first cluster with the second cluster. The detected traffic line is shown in FIG. 5E.

A virtual traffic line generation apparatus 400 of FIG. 1 may determine reliability of the traffic line detected for each frame by the traffic line detection device 300, may store the reliability of the traffic line for each frame, and may generate a virtual traffic line based on a traffic line with the highest reliability among traffic lines detected in a previous frame when the traffic line is not detected.

The virtual traffic line generation apparatus 400 may determine reliability of the traffic line detected for each frame by the traffic line detection device 300, may store the reliability of the traffic line for each frame, may generate a virtual traffic line based on a traffic line with the highest reliability among the traffic lines detected in the previous frame when the traffic line is not detected, and may provide the virtual traffic line and reliability corresponding to the virtual traffic line together.

The virtual traffic line generation apparatus 400 may represent the traffic line detected from each frame by the traffic line detection device 300 in a form of a quadratic function and may determine a degree to which the quadratic function is identical to a real traffic line as reliability.

Hereinafter, a detailed configuration of the virtual traffic line generation apparatus 400 will be described with reference to FIG. 6.

Figure 6:
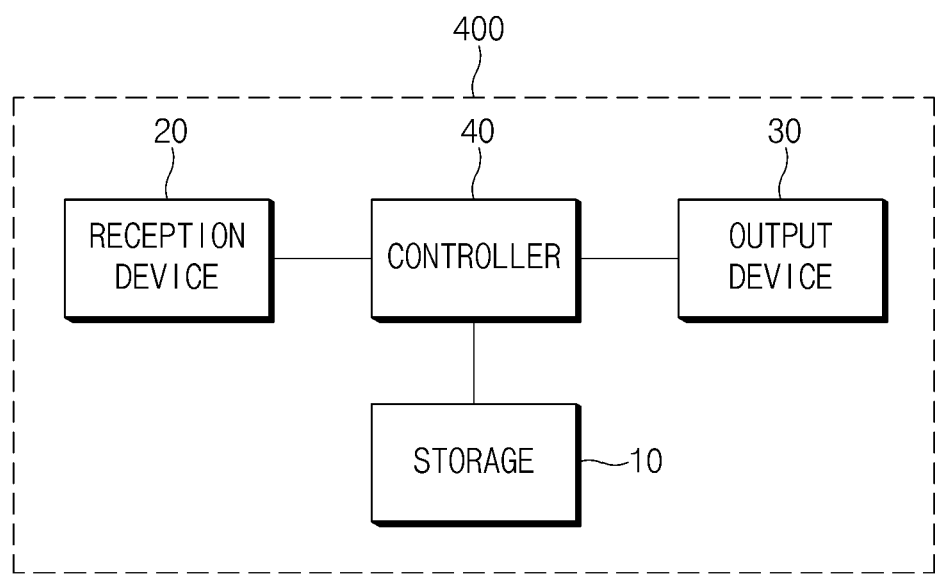
FIG. 6 is a block diagram illustrating a configuration of a virtual traffic line generation apparatus according to an exemplary embodiment of the present disclosure.

FIG. 6 is a block diagram illustrating a configuration of a virtual traffic line generation apparatus according to an exemplary embodiment of the present disclosure.

As shown in FIG. 6, a virtual traffic line generation apparatus 400 according to an exemplary embodiment of the present disclosure may include a storage 10, a reception device 20, an output device 30, and a controller 40. In the instant case, the respective components may be combined into one component and some components may be omitted, depending on a manner which executes the virtual traffic line generation apparatus 400 according to an exemplary embodiment of the present disclosure.

Seeing the respective components, first of all, the storage 10 may store various logics, algorithms, and programs required in a process of determining reliability of a traffic line detected for each frame by a traffic line detection device 300 of FIG. 1, storing the reliability of the traffic line for each frame, and generating a virtual traffic line based on a traffic line with the highest reliability among traffic lines detected in a previous frame when the traffic line is not detected.

The storage 10 may store various logics, algorithms, and programs required in a process of determining reliability of a traffic line detected for each frame by the traffic line detection device 300, storing the reliability of the traffic line for each frame, generating a virtual traffic line based on a traffic line with the highest reliability among traffic lines detected in a previous frame when the traffic line is not detected, and providing the virtual traffic line and reliability corresponding to the virtual traffic line together.

The storage 10 may store information related to a traffic line detected for each frame by the traffic line detection device 300.

The storage 10 may store reliability of the traffic line for each frame. In the instant case, the storage 10 may store reliability of the traffic line for every a reference number of frames. For example, when the current frame is n, a reference number of frames may be " . . . , n−4, n−3, n−2, n−1, and n".

Such a storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The reception device 20 may be a module for receiving information related to a traffic line detected for each frame from the traffic line detection device 300. When the virtual traffic line generation apparatus 400 is implemented to merge into the traffic line detection device 300, the reception device 20 is not necessarily an essential component.

The output device 30 may include a display device configured for displaying the traffic line detected by the traffic line detection device 300 or a virtual traffic line generated by the virtual traffic line generation apparatus 400 and a communication device configured for transmitting information related to the traffic line detected by the traffic line detection device 300 or information related to the virtual traffic line generated by the virtual traffic line generation apparatus 400 to an autonomous vehicle.

Herein, the display device may include a cluster provided in the vehicle. The communication device may include at least one of a mobile communication module, a wireless Internet module, or a short-range communication module.

The mobile communication module may communicate over a mobile communication network constructed according to technical standards for mobile communication or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like).

The wireless Internet module may be a module for wireless Internet access, which may communicate through wireless LAN (WLAN), wireless-fidelity (Wi-Fi), Wi-Fi Direct, digital living network alliance (DLNA), wireless broadband (WiBro), Worldwide Interoperability for Microwave Access (WiMAX), high speed downlink packet access (HSDPA), high speed uplink packet access (HSUPA), long term evolution (LTE), long term evolution-advanced (LTE-A), or the like.

The short-range communication module may support short-range communication using at least one of Bluetooth™, radio frequency identification (RFID), infrared data association (IrDA), ultra wideband (UWB), ZigBee, near field communication (NFC), and wireless universal serial bus (USB) technologies.

The controller 40 may perform the overall control so that respective components may normally perform their own functions. Such a controller 40 may be implemented in a form of hardware, may be implemented in a form of software, or may be implemented in a form of a combination thereof. The controller 40 may be implemented as, but not limited to, a microprocessor.

The controller 40 may perform a variety of control in a process of determining reliability of the traffic line detected for each frame by the traffic line detection device 300, storing the reliability of the traffic line for each frame, and generating a virtual traffic line based on a traffic line with the highest reliability among traffic lines detected in a previous frame when the traffic line is not detected.

Furthermore, the controller 40 may perform a variety of control in a process of determining reliability of a traffic line detected for each frame by the traffic line detection device 300, storing the reliability of the traffic line for each frame, generating a virtual traffic line based on a traffic line with the highest reliability among traffic lines detected in a previous frame when the traffic line is not detected, and providing the virtual traffic line and reliability corresponding to the virtual traffic line together.

Hereinafter, the operation of the controller 40 will be described in detail.

The controller 40 may determine reliability of the traffic line detected for each frame by the traffic line detection device 300 and may store the reliability of the traffic line for each frame in the storage 10.

When the traffic line detection device 300 does not detect a traffic line of a current frame, the controller 40 may search the storage 10 for a traffic line with the highest reliability among traffic lines detected in a previous frame and may generate a virtual traffic line based on the found traffic line.

The controller 40 may represent the traffic line detected from each frame by the traffic line detection device 300 in a form of a quadratic function and may determine a degree to which the quadratic function is identical to a real traffic line as reliability. Hereinafter, the process of determining the reliability of the traffic line will be described in detail with reference to FIG. 5E.

In FIG. 5E, reference numeral 510 indicates a real traffic line, and reference numeral 520 indicates a traffic line detected by the controller 40. The controller 40 may obtain an x2 value on a quadratic function of the traffic line 520 for a y value with respect to any coordinate value (x1, y) on the real traffic line 510, may determine an error between an x1 value on the real traffic line 510 and the x2 value on the quadratic function of the traffic line 520, and may count the case where the error is less than or equal to a reference value as the valid number of times. Thereafter, the controller 40 may determine the ratio of the valid number of times to the total number of times as reliability of the traffic line 520. In the instant case, it is advantageous in terms of accuracy that the total number of times is greater than the reference number of times (e.g., 1000 times).

Figure 7:
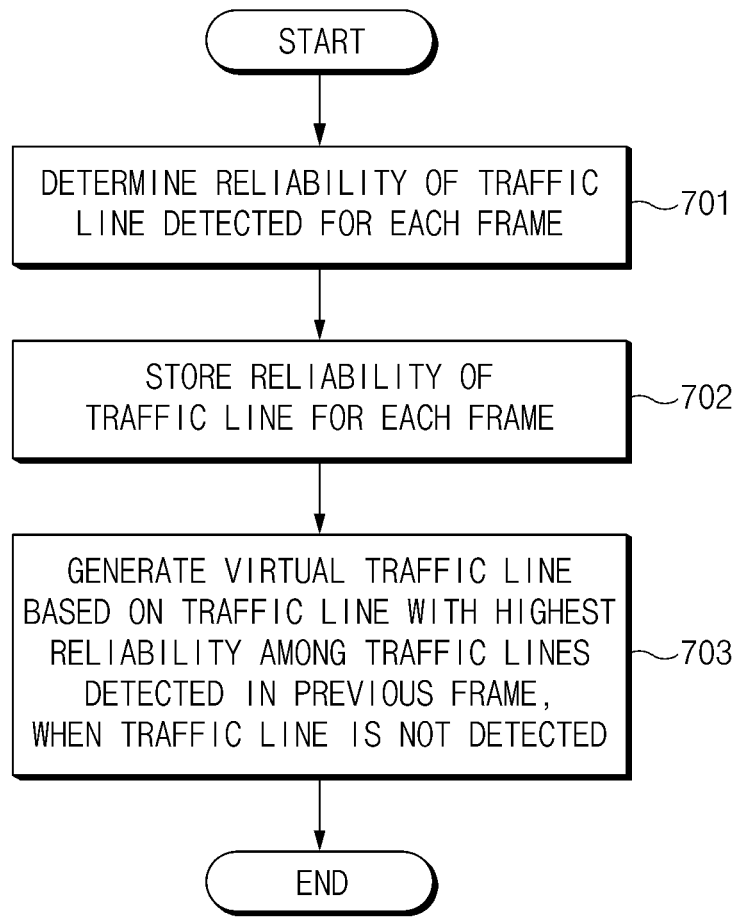
FIG. 7 is a flowchart illustrating a virtual traffic line generation method according to an exemplary embodiment of the present disclosure.

FIG. 7 is a flowchart illustrating a virtual traffic line generation method according to an exemplary embodiment of the present disclosure.

First of all, in operation 701, a controller 40 of FIG. 6 may determine reliability of a traffic line detected for each frame.

Thereafter, in operation 702, a storage 10 of FIG. 6 may store the reliability of the traffic line for each frame, which is determined by the controller 40.

Thereafter, in operation 703, when the traffic line is not detected, in operation 703, the controller 40 may generate a virtual traffic line based on a traffic line with the highest reliability among traffic lines detected in a previous frame.

Figure 8:
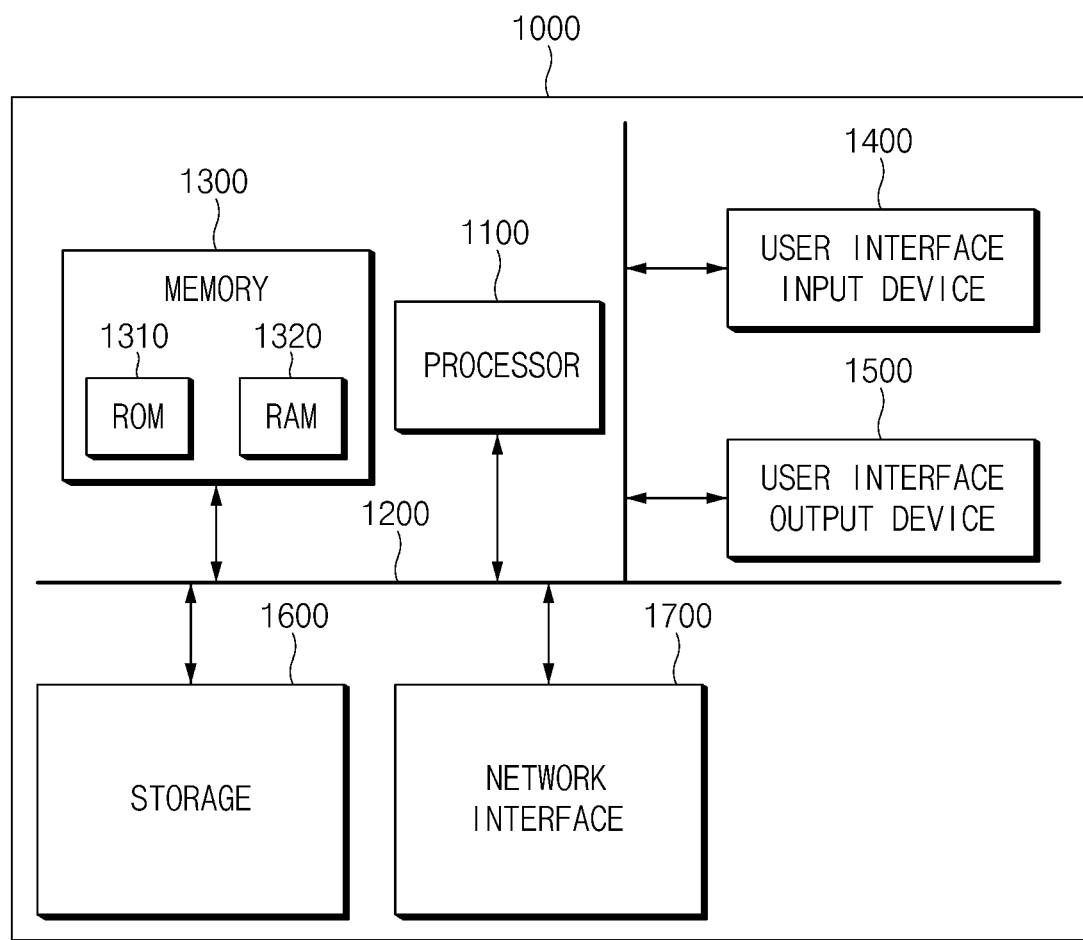
FIG. 8 is a block diagram illustrating a computing system for executing a virtual traffic line generation method according to an exemplary embodiment of the present disclosure.

FIG. 8 is a block diagram illustrating a computing system for executing a virtual traffic line generation method according to an exemplary embodiment of the present disclosure.

Referring to FIG. 8, the above-mentioned virtual traffic line generation method according to an exemplary embodiment of the present disclosure may be implemented by the computing system. A computing system 1000 may include at least one processor 1100, a memory 1300, a user interface input device 1400, a user interface output device 1500, storage 1600, and a network interface 1700, which are connected to each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, an SSD (Solid State Drive), a removable disk, and a CD-ROM. The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present disclosure may determine reliability of a traffic line detected for each frame, may store the reliability of the traffic line for each frame, and may generate a virtual traffic line based on a traffic line with the highest reliability among traffic lines detected in a previous frame when the traffic line is not detected, thus ensuring driving safety of an autonomous vehicle even when the traffic line is not detected.

Furthermore, the present disclosure may determine reliability of a traffic line detected for each frame, may store the reliability of the traffic line for each frame, may generate a virtual traffic line based on a traffic line with the highest reliability among traffic lines detected in a previous frame when the traffic line is not detected, and may provide the virtual traffic line and reliability corresponding to the virtual traffic line together so that an autonomous vehicle may use the reliability as a parameter when performing various autonomous driving policies.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A virtual traffic line generation apparatus, comprising:
a controller configured to determine reliability of a traffic line detected for each frame and to generate a virtual traffic line based on a traffic line with a highest reliability among traffic lines detected in a previous frame when the traffic line is not detected; and
a storage storing the reliability of the traffic line for each frame,
wherein the controller is configured to represent the detected traffic line in a form of a quadratic function and configured to determine a degree to which the quadratic function is identical to a real traffic line as the reliability of the detected traffic line.

2. The virtual traffic line generation apparatus of claim 1, further including:
a traffic line detection device including a traffic line detection model, deep learning of which is completed, to determine the traffic line.

3. The virtual traffic line generation apparatus of claim 1, wherein the controller is configured to obtain an x2 value on the quadratic function for a y value with respect to any coordinate value (x1, y) on the real traffic line, to determine an error between an x1 value on the real traffic line and the x2 value on the quadratic function, to count a case where the error is less than or equal to a reference value as a valid number of times, and to determine a ratio of the valid number of times to a total number of times as the reliability of the detected traffic line.

4. The virtual traffic line generation apparatus of claim 3, wherein the total number of times is greater than a reference number of times.

5. The virtual traffic line generation apparatus of claim 1, wherein the controller is configured to provide the virtual traffic line and reliability corresponding to the virtual traffic line together to an autonomous vehicle.

6. The virtual traffic line generation apparatus of claim 1, further including:
a display device configured for displaying the detected traffic line or the virtual traffic line.

7. A virtual traffic line generation method, comprising:
determining, by a controller, reliability of a traffic line detected for each frame;
storing, by a storage, the reliability of the traffic line for each frame; and
generating, by the controller, a virtual traffic line based on a traffic line with a highest reliability among traffic lines detected in a previous frame, when the traffic line is not detected,
wherein the determining of the reliability includes:
representing the detected traffic line in a form of a quadratic function; and
determining a degree to which the quadratic function is identical to a real traffic line as the reliability of the detected traffic line.

8. The virtual traffic line generation method of claim 7, wherein the traffic line is detected by a traffic line detection model, deep learning of which is completed.

9. The virtual traffic line generation method of claim 7, wherein the determining of the degree to which the quadratic function is identical to the real traffic line as the reliability of the detected traffic line includes:
obtaining an x2 value on the quadratic function for a y value with respect to any coordinate value (x1, y) on the real traffic line;
determining an error between an x1 value on the real traffic line and the x2 value on the quadratic function;
counting a case where the error is less than or equal to a reference value as a valid number of times; and
determining a ratio of the valid number of times to a total number of times as the reliability of the detected traffic line.

10. The virtual traffic line generation method of claim 9, wherein the total number of times is greater than a reference number of times.

11. The virtual traffic line generation method of claim 8, further including:
providing the virtual traffic line and reliability corresponding to the virtual traffic line together to an autonomous vehicle.

12. The virtual traffic line generation method of claim 8, displaying the detected traffic line or the virtual traffic line in a display device.

* * * * *